United States Patent [19]
Presley et al.

[11] 3,937,994
[45] Feb. 10, 1976

[54] MAGNETIC SPEED SENSOR

[75] Inventors: Rex Wallace Presley, Livonia; Jack Richardson Lorraine, Howell, both of Mich.

[73] Assignee: The Bendix Corporation, South Bend, Ind.

[22] Filed: June 13, 1974

[21] Appl. No.: 478,989

[52] U.S. Cl. .............................. 310/168; 310/155
[51] Int. Cl.² ...................................... H02K 21/38
[58] Field of Search ..... 336/135; 340/199; 310/155, 310/168, 70 A, 153, 154

[56] References Cited
UNITED STATES PATENTS

| | | | |
|---|---|---|---|
| 2,110,144 | 3/1938 | Durkee et al. | 310/155 |
| 2,484,022 | 10/1949 | Esval | 336/135 X |
| 2,689,332 | 9/1954 | Greene | 310/155 X |
| 2,853,638 | 9/1958 | Bonnano et al. | 310/155 X |
| 3,564,313 | 2/1971 | Goor | 310/168 |
| 3,836,800 | 9/1974 | Bonvicini | 310/168 X |

*Primary Examiner*—Donovan F. Duggan
*Attorney, Agent, or Firm*—Ken C. Decker; S. H. Hartz

[57] ABSTRACT

A speed sensor for a vehicle wheel has a rotating tone wheel with a stationary magnetic sensor having a pair of sensing poles positioned proximate the tone wheel teeth. Coil means are wound on the poles and the poles are magnetized to induce a signal voltage in the coil means corresponding to wheel speed. The poles are phased relative to the teeth on the tone wheel to reduce noise voltage components in the wheel speed signal voltage due to axial misalignment and vibration of the tone wheel. The poles may be phased 180° relative to one another with respect to the teeth on the tone wheel so that one pole is in registry with a tooth when the other pole is in registry with a space between two teeth. With this arrangement the combined reluctance of the poles is approximately constant.

10 Claims, 10 Drawing Figures

FIG.1
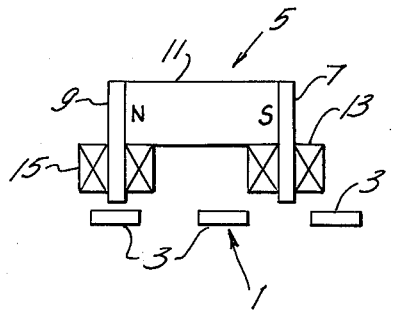
FIG.2
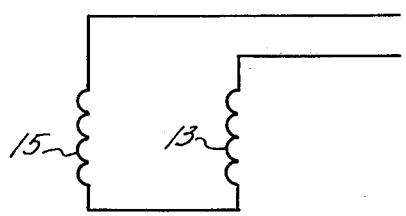
FIG.3
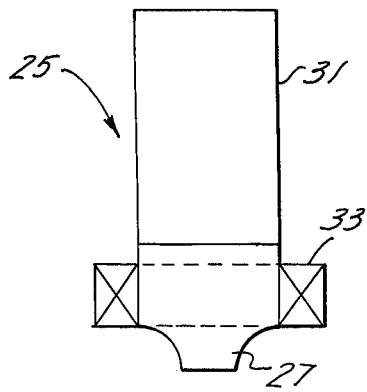
FIG.4
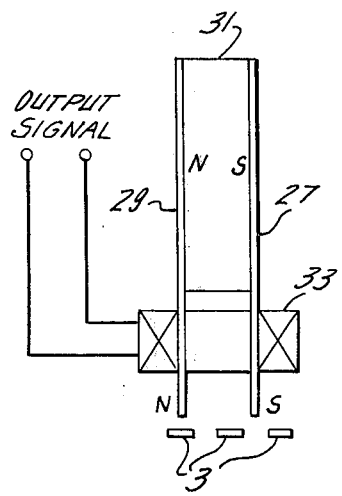
FIG.5

MAGNETIC SPEED SENSOR

The invention relates to adaptive braking systems for use on vehicles such as automobiles or trucks and more specifically to wheel speed sensors for providing the adaptive braking system with information relating to the speed and acceleration of the wheels. The invention can be used in the adaptive braking system described in U.S. Pat. No. 3,494,671 and may be applied to the wheel speed sensors described in U.S. Pat. Nos. 3,626,225; 3,626,226; 3,626,227; 3,626,228 and 3,629,635. All of the above patents are assigned to the same assignee as the present application.

The present invention reduces the effects of axial tone wheel misalignment and axial tone wheel vibration. Axial tone wheel misalignment, such as run out or wobble, causes low frequency noise components in the speed signal. Axial tone wheel vibration causes high frequency noise components in the speed signal. In adaptive braking systems the speed signal is usually time differentiated to obtain an acceleration signal and this causes the noise components to reach excessive values. Of course, the low frequency noise components can be reduced to an acceptable level by close manufacturing tolerances and accurate alignment of the tone wheel, but the cost of this solution is much too high for automotive applications. The speed signal must be filtered to reduce the high frequency noise components.

The invention contemplates a speed sensor for a vehicle wheel comprising a tone wheel driven by the vehicle and subject to axial misalignment and vibration, the tone wheel being made of magnetic material and having a plurality of teeth, and sensing means having a pair of poles of magnetic material proximate the tone wheel teeth, coil means on the poles, and means for magnetizing the poles to induce a signal voltage in the coil means corresponding to the wheel speed upon rotation of the tone wheel relative to the sensing means, the poles on the sensing means being phased relative to the teeth on the tone wheel to reduce noise voltage components in the wheel speed signal voltage due to axial misalignment and vibration of the tone wheel.

The present invention reduces the noise components to an acceptable level even when the tone wheel is warped and axially misaligned and subject to severe vibrations by using two sensing poles located radially proximate the tone wheel teeth and separated from one another circumferentially of the tone wheel to provide a suitable phase difference between the flux in the two poles. In the preferred embodiment the phase difference is 180° so that one pole is adjacent a tooth when the other pole is adjacent a space between two teeth. A single sensing coil may be wound on both poles or a sensing coil may be wound on each pole with the sensing coils connected in series opposition and preferably having the same number of turns.

The wheel speed signal components $A \sin wt$ add and the low frequency noise components due to axial misalignment cancel. The low frequency noise components $V_0$ may be considered constant for a few cycles of the signal component so that the voltages $V_1$ and $V_2$ induced in the separate sensing coils are:

$$V_1 = V_0 + A \sin wt \quad (1)$$
$$V_2 = V_0 - A \sin wt \quad (2)$$
$$V_1 - V_2 = 2A \sin wt \quad (3)$$

With the sensing coils connected in series opposition the low frequency noise components cancel and the signal voltages induced in the sensing coils are added.

The high frequency noise components due to vibration are reduced considerably unless the high frequency noise components are exactly in phase with the signal voltage. In one position of the tone wheel relative to the sensor poles, the reluctance between the tone wheel and both sensors is the same and the vibration noise components are cancelled almost completely in this position since the same voltage amplitude is generated in each sensing coil. When one sensing pole is adjacent a tooth and the other sensing pole is adjacent a space between two teeth the difference in reluctance between the tone wheel and sensors is maximum and the difference in signals including the high frequency components in the two sensing coils is maximum.

With a single coil wound on both sensing poles, as the tone wheel rotates the flux through the coil changes direction as the poles alternately are positioned adjacent the teeth and the change of flux through the coil generates a speed signal. Axial vibration causing high frequency noise components increases the flux through both poles and, because the flux is in opposite directions, it effectively cancels. The degree of cancellation of the high frequency noise components depends on the tone wheel position relative to the sensing poles and the greatest cancellation occurs when both poles have equal flux paths. Low frequency noise components caused by wheel misalignment increases the flux in both poles as the tone wheel moves towards the poles and the noise components cancel since the flux through the coil is in opposite directions.

In another arrangement, the two sensors are phased 90° apart and this configuration may be more effective in cancelling the high frequency component due to tone wheel vibration than the arrangements described briefly above since the maximum difference in reluctance of the two poles is less. However, this arrangement may not be as effective in cancelling the low frequency components due to tone wheel misalignment as the arrangements described briefly above.

With a phase difference of 180° between the poles, that is, when one pole is adjacent a tooth and the other pole is adjacent a space between two teeth, a constant reluctance load is presented to the permanent magnet and this reduces noise resulting from tone wheel misalignment and vibration. As the tone wheel rotates the permeance of each pole varies approximately sinusodially and the phase difference is 180°. The combined permeance of the two poles is approximately constant as shown by the following equations:

$$P_1 = P_0 + \Delta P \sin \theta \quad (4)$$
$$P_2 = P_0 - \Delta P \sin \theta \quad (5)$$
$$P_1 + P_2 = 2P_0 \quad (6)$$

Where $P$ is steady state permeance due to air gap,
$P_1$ is the permeance of pole 1,
$P_2$ is the permeance of pole 2,
$\Delta P \sin \theta$ is the permeance variation due to tone wheel rotation.

The reluctance $R$ also is constant since it is the reciprocal of permeance and is given by the following equation:

$$R = \frac{1}{P_1} + \frac{1}{P_2} = \frac{1}{2P_0} \quad (7)$$

When the reluctance of the wheel speed sensor varies a minor magnetic hysteresis loop is generated each time a tooth passes a sensor pole and the sensor inductance varies with the position of a tooth relative to a pole. This distorts the speed signal waveform resulting in speed signal frequency modulation noise. With constant reluctance the minor magnetic hysteresis loop does not occur and there is no variation in sensor inductance and the speed signal is a sinusodial waveform without appreciable distortion.

BRIEF DESCRIPTION OF THE DRAWINGS

FIG. 1 is a schematic diagram of a wheel speed sensor constructed according to the invention, FIG. 2 is a wiring diagram showing the coils of FIG. 1 connected in series opposition, FIG. 3 is a schematic diagram partly in section of a second embodiment of a wheel speed sensor constructed according to the invention, FIG. 4 is an end view of the embodiment shown in FIG. 3, FIG. 5 is a front view of the embodiment shown in FIG. 3.

DETAILED DESCRIPTION OF THE INVENTION

Figure 6:
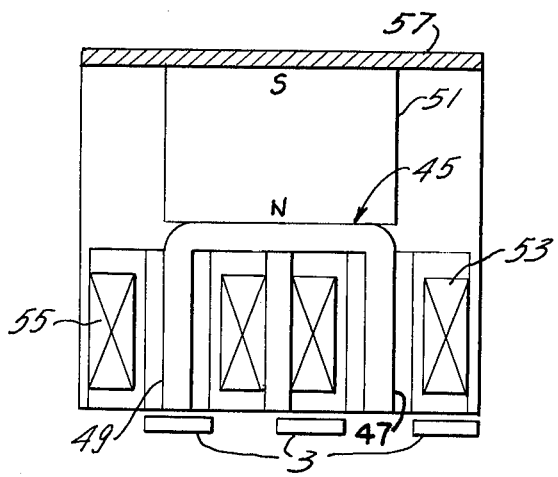
FIG. 6 is a schematic diagram partly in section of a third embodiment of a wheel speed sensor constructed according to the invention.

Referring to FIG. 1 of the drawings, the wheel speed sensor shown therein and constructed according to the invention includes a tone wheel 1 of magnetic material having a series of equally spaced teeth 3 about its periphery. The tone wheel may be secured to the vehicle wheel hub and may be of relatively large diameter or it may be frictionally driven and of relatively small diameter as described in the above patents. The friction drive may be operated by the wheel or drive shaft or in any other suitable manner.

A magnetic sensor 5 has a pair of sensing poles 7 and 9 secured to the ends of a permanent magnet 11 in U-shaped configuration. Coils 13 and 15 are wound on sensing poles 7 and 9, respectively, and the coils are connected in series opposition as shown in FIG. 2.

The magnetic sensor is mounted on a stationary part of the vehicle with poles 7 and 9 located radially at tooth centers proximate the tone wheel. The poles are spaced relative to teeth 3 so that one pole is adjacent a tooth when the other pole is adjacent a space between two teeth. This arrangement provides 180° phase difference between the flux in the two poles and presents a constant reluctance load to the permanent magnet.

In FIGS. 3, 4 and 5 the magnetic sensor 25 comprises a pair of sensing poles 27 and 29 secured to a permanent magnet 31. A single coil 33 is wound on both sensing poles. The poles are spaced relative to teeth 3 on the tone wheel so that one pole is adjacent a tooth when the other pole is adjacent a space between two teeth to provide a 180° phase difference between the flux in the two poles and to present a constant reluctance load to the permanent magnet. The poles are shaped so that the ends adjacent the teeth are substantially smaller than the remainder of the poles and preferably smaller than the depth of the teeth on the tone wheel.

Figure 7:
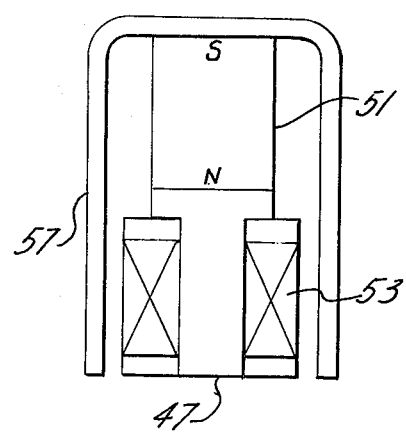
FIG. 7 is an end view of the embodiment shown in FIG. 6.
Figure 8:
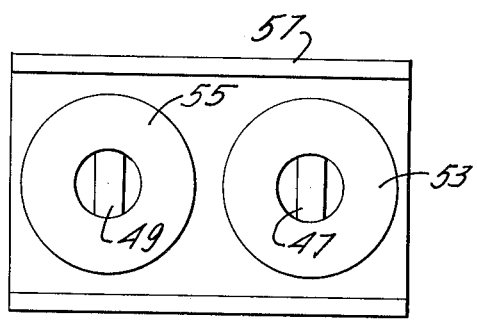
FIG. 8 is a front view of the embodiment shown in FIG. 6.

In FIGS. 6, 7 and 8, the magnetic sensor comprises a U-shaped pole piece 45 having poles 47 and 49. The pole piece is secured at the base of the U to a permanent magnet 51. Sensing coils 53 and 55 are wound on poles 47 and 49, respectively, and are connected in series opposition as shown in FIG. 2. A U-shaped shield 57 is secured to permanent magnet 31 and provides a return path for magnetic flux and shields the sensor from electromagnetic noise. Poles 47 and 49 are located radially at tooth centers proximate the tone wheel and one arm of U-shaped shield 57 is positioned proximate the tone wheel spaced from the teeth. The poles are spaced relative to teeth 3 so that one pole is adjacent a tooth when the other pole is adjacent a space between two teeth to provide a 180° phase difference between the flux in the two poles and to present a constant reluctance load to the permanent magnet.

Figure 9:
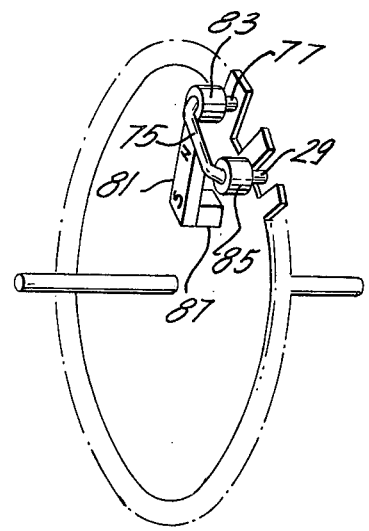
FIG. 9 is an isometric view of a fourth embodiment of a wheel speed sensor constructed according to the invention.

In FIG. 9 the magnetic sensor comprises a U-shaped pole piece 75 having poles 77 and 79. One end of a permanent magnet 81 is secured to pole piece 75. Sensing coils 83 and 85 are wound on poles 77 and 79, respectively, and are connected in series opposition as shown in FIG. 2. A third pole 87 is secured to the other end of permanent magnet 81 and directs the return flux from the tone wheel to the magnet similarly to the embodiment of FIGS. 6, 7 and 8. Poles 77 and 79 are located radially at tooth centers proximate the tone wheel and pole 87 is positioned proximate the tone wheel spaced from the teeth. Poles 77 and 79 are spaced relative to teeth 3 so that one pole is adjacent a tooth when the other pole is adjacent a space between two teeth to provide 180° phase difference between the flux in the two poles and to present a constant reluctance load to the permanent magnet.

Figure 10:
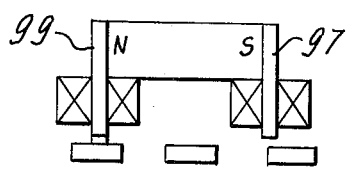
FIG. 10 is a schematic diagram of a fifth embodiment of a wheel speed sensor constructed according to the invention.

The embodiment shown in FIG. 10 is substantially the same as the embodiment shown in FIG. 1 except that sensing poles 97 and 99 are spaced relative to teeth 3 so that one pole is adjacent a tooth when one half of the other pole is adjacent a space between two teeth and the other half of the pole is adjacent a tooth. This arrangement provides a 90° phase difference between the flux in the two poles.

Although the reluctance in this arrangement is not constant it is more effective in cancelling vibration noise than the other arrangements where the poles are phased 180° because the maximum difference in reluctance between the two poles is less than in those arrangements.

As explained above, this arrangement is effective in cancelling high frequency components due to tone wheel vibration because the maximum difference in reluctance of the two poles is small.

In all the above embodiments of the invention noise components are reduced to an acceptable level even when the tone wheel is warped and axially misaligned and subject to severe vibrations. Low frequency noise components due to axial misalignment cancel and high frequency noise components due to axial vibration are reduced considerably. A constant reluctance load is presented to the permanent magnet to prevent minor magnetic hysteresis loops from occuring and there is no variation in sensor inductance. The speed signal is a sinusodial waveform without appreciable distortion.

What is claimed is:

1. A speed sensor for a vehicle wheel comprising a tone wheel driven by the vehicle and subject to axial misalignment and vibration, the tone wheel being made of magnetic material and having a plurality of teeth, and sensing means having a pair of poles of magnetic material proximate the tone wheel teeth, coil means on the poles, and a permanent magnet having one of its poles connected to the poles on the sensing means for magnetizing the poles on the sensing means to induce a signal voltage in the coil means corresponding to wheel speed upon rotation of the tone wheel relative to the sensing means, the poles on the sensing means being phased relative to the teeth on the tone wheel to reduce noise voltage components in the wheel speed signal voltage due to axial misalignment and vibration of the tone wheel, and a substantially U-shaped shield connected to the other pole of the permanent magnet and enclosing a substantial portion of the sensing means from electromagnetic noise, a portion of the U-shaped shield being positioned adjacent the tone wheel remote from the teeth to provide a return path for magnetic flux.

2. A speed sensor as described in claim 1 in which the poles on the sensing means are spaced relative to the tone wheel teeth so that one of the poles is in registry with a tooth when the other pole is in registry with a space between two teeth.

3. A speed sensor as described in claim 1 in which the poles on the sensing means are phased 180° relative to one another with respect to the teeth on the tone wheel.

4. A speed sensor as described in claim 1 in which the coil means includes a separate coil wound on each sensing pole and the coils are connected in series opposition.

5. A speed sensor as described in claim 1 in which the poles on the sensing means are phased relative to the teeth on the tone wheel so the combined reluctance of the poles is approximately constant.

6. A speed sensor for a vehicle wheel comprising a tone wheel driven by the vehicle and subject to axial misalignment and vibration, the tone wheel being made of magnetic material and having a plurality of teeth, and sensing means having a pair of poles of magnetic material proximate the tone wheel teeth, coil means on the poles, and a permanent magnet having one of its poles connected to both poles of the sensing means for magnetizing the poles to induce a signal voltage in the coil means corresponding to wheel speed upon rotation of the tone wheel relative to the sensing means, the poles on the sensing means being phased relative to the teeth on the tone wheel to reduce noise voltage components in the wheel speed signal voltage due to axial misalignment and vibration of the tone wheel, and the sensing means including a third pole connected to the other pole of the permanent magnet and positioned proximate the tone wheel remote from the teeth to provide a return path for magnetic flux.

7. A speed sensor as described in claim 6 in which the pair of poles on the sensing means are spaced relative to the tone wheel teeth so that one of the poles is in registry with a tooth when the other pole is in registry with a space between two teeth.

8. A speed sensor as described in claim 6 in which the pair of poles on the sensing means are phased 180° relative to one another with respect to the teeth on the tone wheel.

9. A speed sensor as described in claim 6 in which the coil means includes a separate coil wound on each sensing pole of the pair and the coils are connected in series opposition.

10. A speed sensor as described in claim 6 in which the pair of poles on the sensing means are phased relative to the teeth on the tone wheel so the combined reluctance of the poles is approximately constant.

* * * * *